United States Patent [19]
Sien

[11] 3,890,005
[45] June 17, 1975

[54] ARTICULATED FRAME MINE DUMPER

[75] Inventor: Gerald Bruce Sien, Carlsbad, N. Mex.

[73] Assignee: Sien Equipment Company, Carlsbad, N. Mex.

[22] Filed: June 6, 1974

[21] Appl. No.: 476,930

[52] U.S. Cl. ............... 298/22 P; 180/14 R; 214/501
[51] Int. Cl. ............................................. B62d 59/00
[58] Field of Search ............ 298/22 R, 22 AE, 22 C, 298/22 P, 1 R; 214/501; 180/14 R, 14 A, 14 B, 14 E

[56] References Cited
UNITED STATES PATENTS

| | | | |
|---|---|---|---|
| 2,752,193 | 6/1956 | Kling | 298/22 P |
| 3,134,628 | 5/1964 | Lacuey et al. | 298/22 P X |
| 3,630,302 | 12/1971 | Holland, Sr. | 180/14 A X |
| 3,696,878 | 10/1972 | Nelson | 180/14 R X |

*Primary Examiner*—Frank E. Werner
*Attorney, Agent, or Firm*—Richards, Harris & Medlock

[57] ABSTRACT

An articulated frame mine dumper comprises a towing vehicle and a towed vehicle having a dump bed, the two vehicles being interconnected by an articulated joint. The joint includes a subframe secured to the frame of the towed vehicle for pivotal movement around a vertical axis, an outer pipe section secured to the frame of the towing vehicle and having a horizontal axis, and an inner pipe section secured to the subframe and received in the outer pipe section. Bushings are mounted in bushing receiving grooves formed at the opposite ends of the interior of the outer pipe section and serve to rotatably support the inner pipe section and to prevent angular displacement between the inner and outer pipe sections. A retaining ring is secured to the end of the inner pipe section remote to the subframe, and thrust washers are positioned between the subframe and the outer pipe section and between the outer pipe section and the retaining ring.

The frame of the towed vehicle includes outwardly extending shoulders positioned at the forward end thereof. The dump bed is pivoted by means of telescoping hydraulic cylinders connected between the shoulders of the frame and the dump bed. Steering of the articulated frame mine dumper is effected by hydraulic cylinders connected between the subframe of the joint and the shoulders of the frame of the towed vehicle at points inboard of the dump bed pivoting cylinders.

12 Claims, 7 Drawing Figures

PATENTED JUN 17 1975  3,890,005

SHEET 3

ARTICULATED FRAME MINE DUMPER

BACKGROUND AND SUMMARY OF THE INVENTION

This invention relates to articulated frame mine dumpers, and more particularly to a mine dumper incorporating an improved articulated joint and an improved dumping cylinder and steering cylinder mounting arrangements.

As is well known, dump trucks designed for surface level hauling operations typically include a rigid frame extending between front steering wheels and rear drive wheels. An engine and an operator's compartment are typically situated forwardly on the frame, and a dump bed is pivotally supported at the extreme rear end of the frame. Hydraulic cylinders are employed to selectively pivot the dump bed between a horizontal material receiving position and a generally angularly disposed material dumping position.

While the foregoing dump truck design has served well for surface level hauling operations, the conditions encountered in subsurface mining operations generally serve to eliminate the conventional dump truck design from consideration. First, subsurface mining operations are usually characterized by extremely restricted vertical dimensions. This requires major departures from the conventional design in order to provide a dumper which can operate within the vertical dimension limitations of subsurface mine conditions. Another factor involves considerations of turning radius since subsurface conditions often include extremely narrow passageways having very sharp corners.

In order to accommodate the foregoing and other conditions encountered in subsurface mining operations, various articulated frame mine dumper designs have been proposed. Such devices typically include a towing vehicle comprising a frame, an engine mounted on the frame, and drive wheels supporting the frame for movement over a surface and operatively connected to the engine to propel the vehicle. A towed vehicle is connected to the towing vehicle by means of an articulated joint and includes a frame, wheels supporting the frame for movement over a surface, a dump bed supported on the frame at the extreme rear end thereof, and hydraulic cylinders for selectively pivoting the dump bed between a horizontal material receiving position and a substantially inclined material dumping position. Hydraulic cylinders and also connected across the articulated joint between the frame of the towed vehicle and the frame of the towing vehicle and are utilized to effect steering of the articulated frame mine dumper.

Notwithstanding the substantial advantages that are derived from the use of an articulated frame vehicle as compared with the use of a conventional dump truck in subsurface applications, a number of problems have remained unsolved. First, although various articulated joint configurations have been proposed heretofore, many have been uneconomical to manufacture. Also, various prior art articulated joint configurations have lacked the ability to perform for long periods of time in a mining or similar environment with little or no maintenance. This can lead to failure of the joint during use which can be particularly troublesome in subsurface operations due to the inability to gain access to the machine to effect repair.

Another problem involving prior art articulated frame mine dumpers relates to the arrangement of the dump bed positioning hydraulic cylinders and the arrangement of the steering hydraulic cylinders with respect to the frame of the towed vehicle. Again, various design configurations have been proposed heretofore, however, the prior art designs have been expensive to manufacture, cumbersome to use, and unreliable in operation.

The present invention comprises an articulated frame mine dumper which overcomes the foregoing and other disadvantages long since associated with the prior art. In accordance with the broader aspects of the invention, an articulated frame mine dumper includes an improved articulated joint which is both economical to manufacture and adapted for long term service in underground operations with little or no maintenance. The articulated frame mine dumper further comprises an improved arrangement of the dump bed positioning and steering hydraulic cylinders with respect to the frame of the towed vehicle which is economical to manufacture and adapted for long term trouble free service.

In accordance with more specific aspects of the invention, an articulated frame mine dumper comprises an articulated joint including a subframe connected to the frame of the towed vehicle for pivotal movement about a vertical axis. An outer pipe section is secured to the frame of the towing vehicle and defines a horizontal axis. The outer pipe section has bushing receiving grooves formed in its interior at the extreme opposite ends thereof. An inner pipe section is secured to the subframe and extends through the outer pipe section. Bushings are received in the bushing receiving grooves of the outer pipe section for rotatably supporting the inner pipe section and for preventing relative angular displacement between the inner and outer pipe sections. A retaining ring is secured to the exterior of the inner pipe section at the end thereof remote from the subframe for preventing relative axial displacement of the outer pipe section. Thrust washers are positioned between the frame and the outer pipe section and between the outer pipe section and the retaining ring.

In accordance with still other aspects of the invention, the frame of the towed vehicle comprises a forward transversely disposed member and parallel rearwardly extending longitudinally disposed members. Shoulder members project outwardly from the opposite sides of the frame at points on the longitudinally disposed members located adjacent the forward transversely disposed member. Telescoping hydraulic cylinders are connected between the outboard ends of the shoulders and the dump bed of the towed vehicle for selectively pivoting the dump bed between the material receiving and material discharging positions. Steering hydraulic cylinders are connected to the shoulders at points inboard from the dump bed positioning hydraulic cylinders and extend to the subframe of the articulated joint to effect steering of the articulated frame mine dumper.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
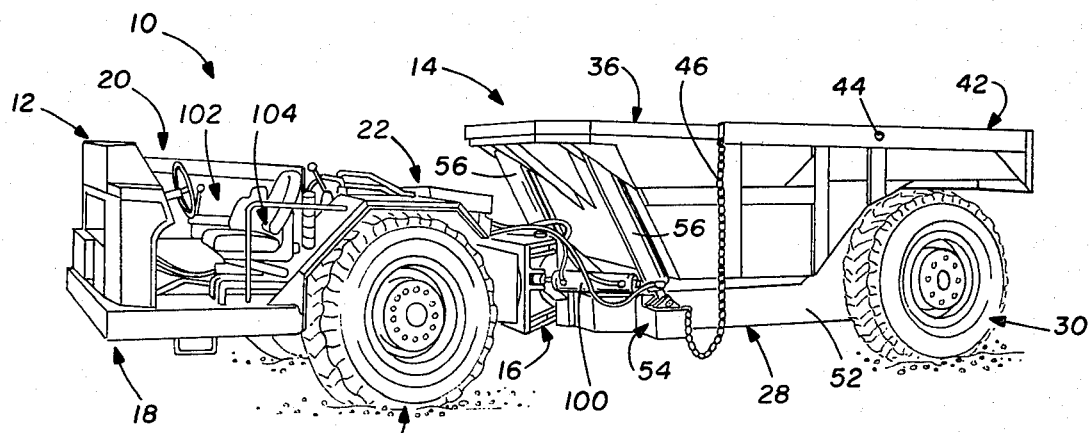
FIG. 1 is a perspective view of an articulated frame mine dumper incorporating the invention.
Figure 2:
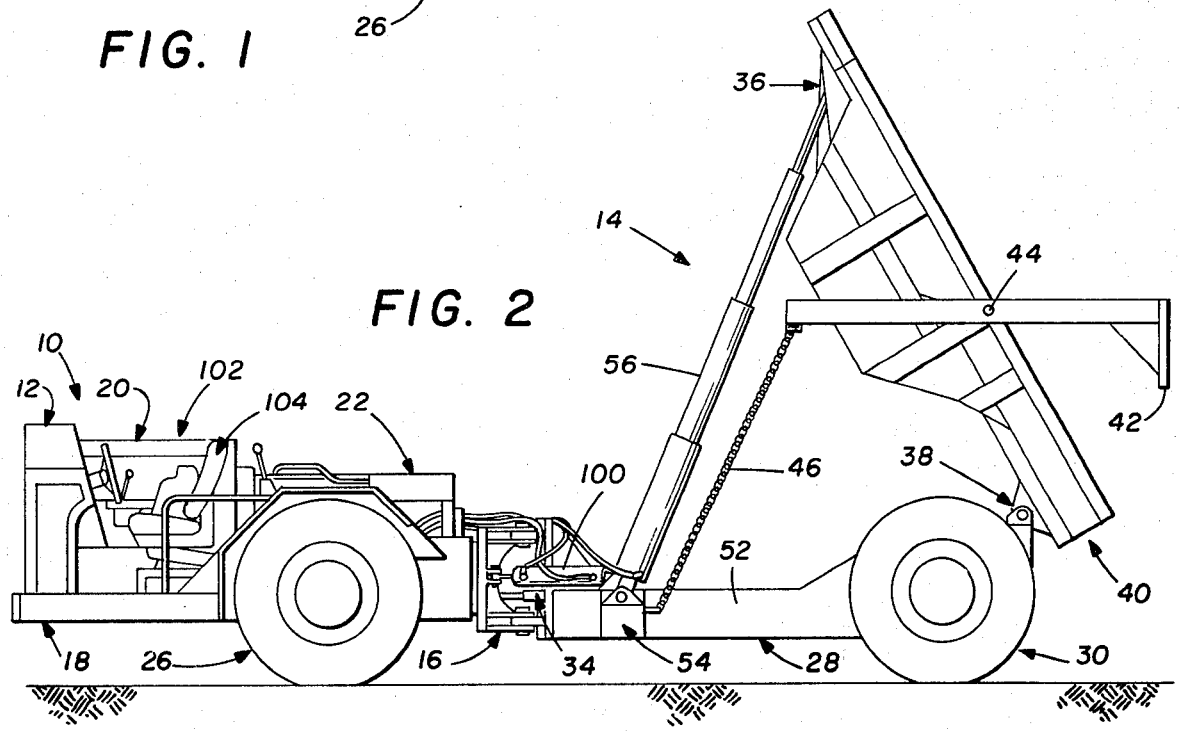
FIG. 2 is a side view of the articulated frame mine dumper.
Figure 3:
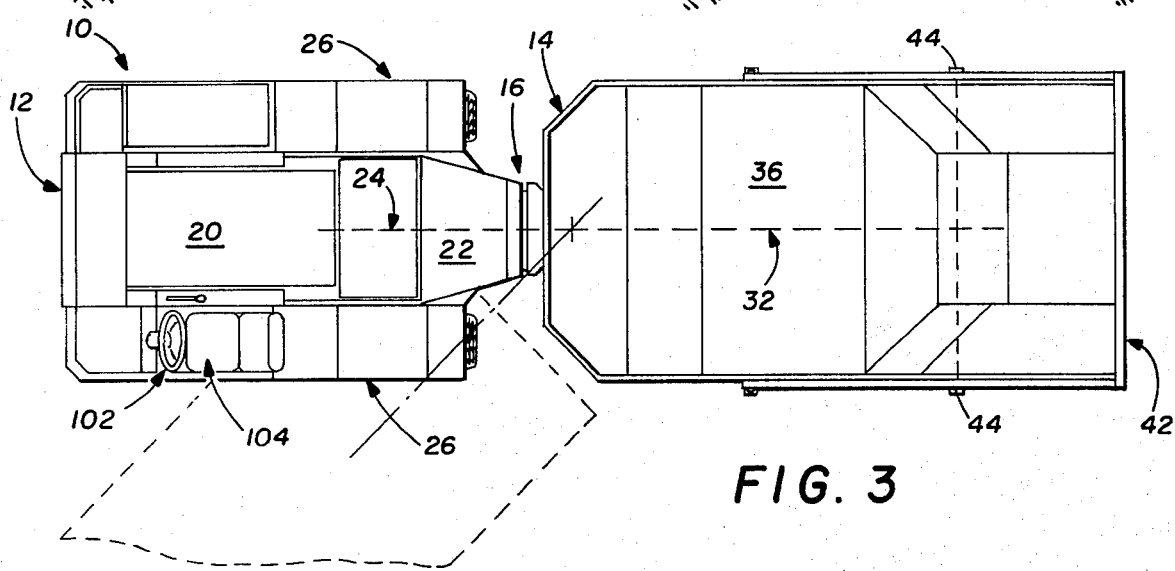
FIG. 3 is a top view of the articulated frame mine dumper.

Referring now to the Drawings, and particularly to FIGS. 1, 2 and 3 thereof, there is shown an articulated frame mine dumper 10 incorporating the invention. The articulated frame mine dumper 10 includes a towing vehicle or tractor 12 and a towed vehicle or trailer 14. The towing vehicle 12 and the towed vehicle 14 are interconnected by an articulated joint 16.

Figure 7:
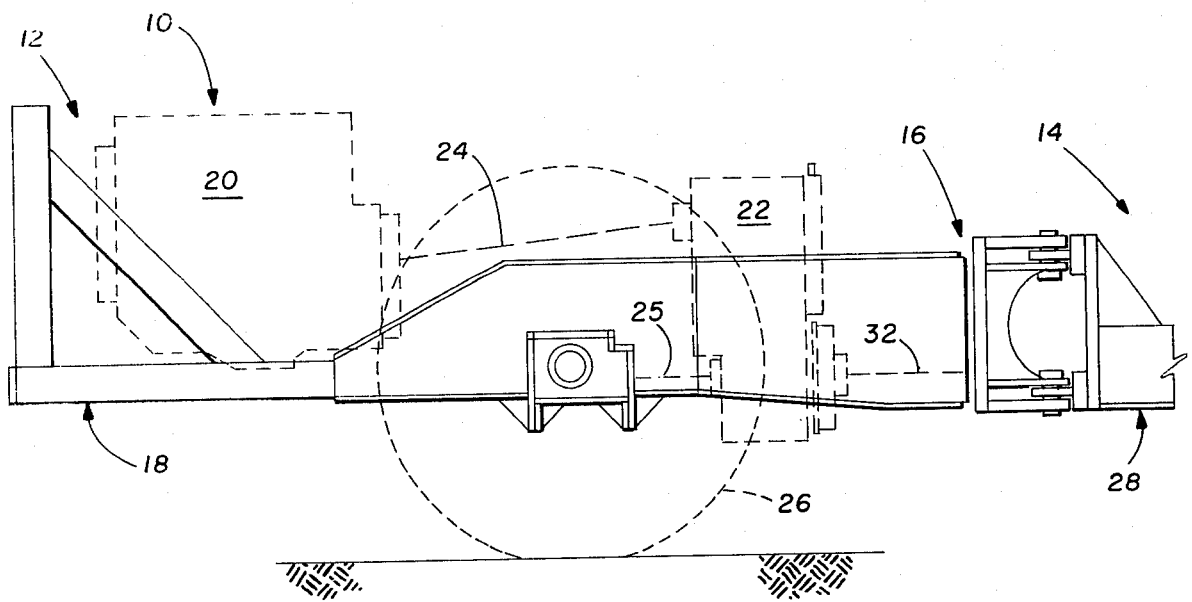
FIG. 7 is an illustration of the arrangement of the engine and the transmission of the towing vehicle of the articulated frame mine dumper.

As is best shown in FIGS. 2 and 7, the towing vehicle 12 of the articulated frame mine dumper 10 comprises a frame 18 and an engine 20 mounted on the frame. For mine usage the engine 20 preferably comprises a diesel engine. The engine 20 has an output which is directed to a power shaft transmission 22 mounted at the rear end of the frame 18 of the towing vehicle 12 in the manner illustrated by the line 24 in FIGS. 3 and 7. As is indicated in FIG. 7 by the line 25, the transmission 22 in turn has a first output which is coupled to a pair of wheels 26 by means of a conventional differential mechanism. Thus, the wheels 26 serve to support the towing vehicle 12 for movement over a surface and also serve to propel the vehicle 12 under the action of the engine 20.

The towed vehicle 14 of the articulated frame mine dumper 10 comprises a frame 28 which is supported for movement over a surface by a pair of wheels 30. As is best shown in FIGS. 3 and 7, the transmission 22 of the towing vehicle 12 has a second output which is operatively coupled to the wheels 30 of the towed vehicle 14 in the manner illustrated by the line 32. Thus, the articulated frame dumper 10 comprises a four-wheel drive vehicle. A portion of a drive shaft 34 interconnecting the transmission 22 and the wheels 30 of the towed vehicle 14 is illustrated in FIG. 2. It will be understood that the wheels 30 are coupled to the drive shaft 34 by means of a conventional differential mechanism.

Referring to FIGS. 1 and 2, a dump bed 36 is pivotally supported on the frame 28 of the towed vehicle 14 at the extreme rear end thereby by means of pins 38. The dump bed 36 has an open rear end 40 which is normally closed by a tail gate 42. The tail gate 42 is pivotally supported on the dump bed 36 by means of pins 44 and is connected to the frame 28 of the towed vehicle 14 by means of chains 46. Thus, whenever the dump bed 36 is raised from the material receiving position illustrated in FIG. 1 to the material dumping position illustrated in FIG. 2, the tail gate 42 is automatically opened. Conversely, whenever the dump bed 36 is returned to the material receiving position the tail gate 42 is automatically closed under the action of gravity.

Figure 5:
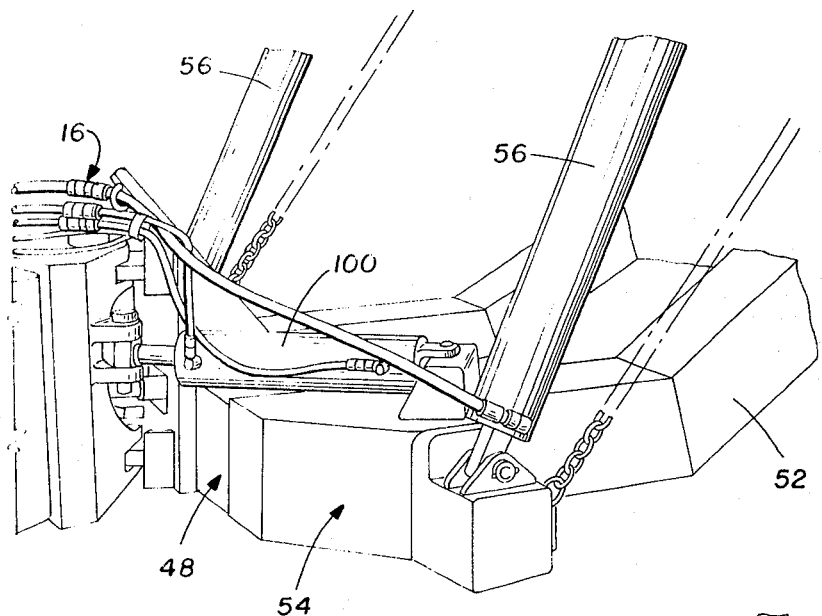
FIG. 5 is an illustration of the mounting arrangement of the dump bed positioning hydraulic cylinders and the steering hydraulic cylinders of the articulated frame mine dumper.
Figure 6:
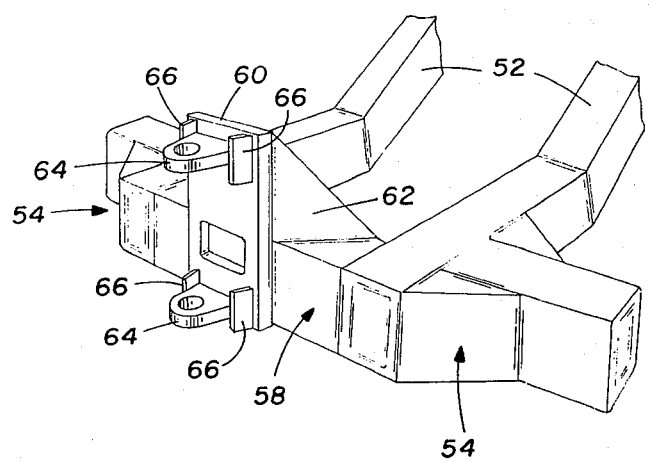
FIG. 6 is a partial perspective view of the frame of the towed vehicle of the articulated frame mine dumper.

As is best shown in FIG. 6, the frame 28 of the towed vehicle 14 comprises a forward transversely disposed member 48 extending to parallel rearwardly extending longitudinally disposed members 52. A pair of shoulders 54 extend from the opposite sides of the frame 28 at points on the longitudinally disposed members 52 adjacent the transversely disposed member 48. Referring to FIGS. 1, 2 and 5, a pair of telescoping hydraulic cylinders 56 are secured to their blind ends to the outboard ends of the shoulders 54 by means of clevises 58. The rod ends of the cylinders 56 are secured to the dump bed 36 of the towed vehicle 14. Thus, the telescoping hydraulic cylinders 56 are operable to selectively pivot the dump bed 36 between the material receiving position illustrated in FIG. 1 and the material dumping position illustrated in FIG. 2.

Figure 4:
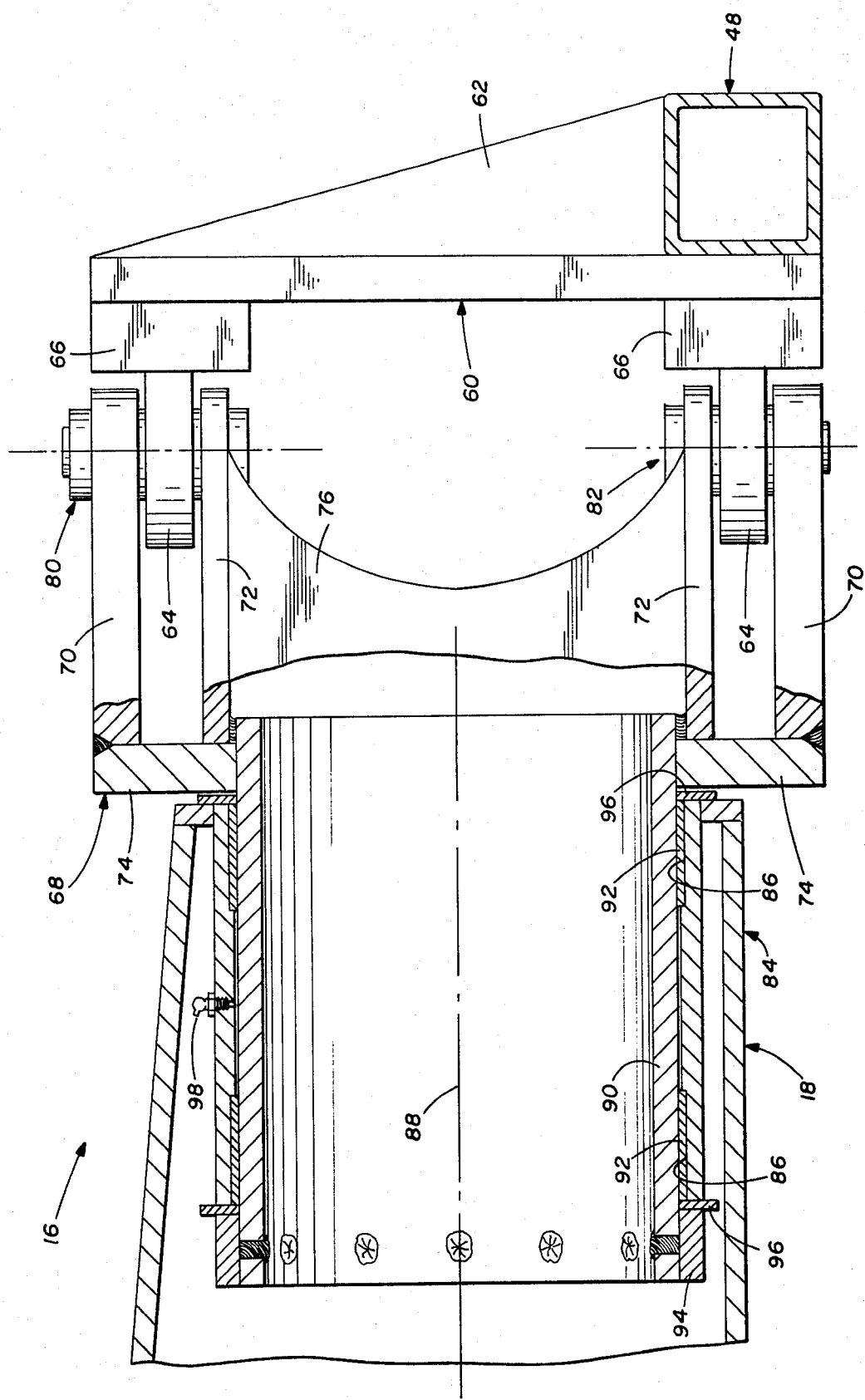
FIG. 4 is a sectional view illustrating the articulated joint of the articulated frame mine dumper.

The articulated joint 16 of the articulated frame mine dumper 10 is illustrated in FIG. 4. A plate 60 extends upwardly from the forward transversely disposed member 48 of the frame 28 of the towed vehicle 14 and is reinforced by gussets 62. A pair of plates 64 each having a vertically disposed pin receiving aperture formed therethrough extend forwardly from the plate 60 and are reinforced by gussets 66. A subframe 68 is secured to the frame 28 of the towed vehicle for pivotal movement with respect thereto about a vertical axis. The subframe 68 comprises upper and lower sets of plates 70 and 72 each extending to a vertically disposed plate 74. Gussets 76 are secured between the plates 72 to reinforce the subframe 68.

Like the plates 64, the plates 70 and 72 of the subframe 68 have pin receiving apertures formed therethrough. A pin 80 is received in the pin receiving apertures of the upper series of plates 70, 64, and 72, and pin 82 is received in the lower series of plates 72, 64 and 70. The pins 80 and 82 are vertically aligned, and thus define an axis of pivotal movement for the articulated joint 16. As will become more apparent hereinafter, the pins 80 and 82 also define the steering axis of the articulated frame mine dumper 10.

An outer pipe section 84 is mounted in the frame 18 of the towing vehicle 12 of the articulated frame mine dumper 10. The outer pipe section 84 is preferably secured in the frame 18 by welding. In accordance with the preferred embodiment of the invention, all welding operations that are required to secure the outer pipe section 84 in the frame 18 are completed prior to machining of the outer pipe section 84. Thereafter, bushing receiving grooves 86 are machined in the extreme opposite ends of the interior of the outer pipe section 84. The outer pipe section 84 is mounted in the frame 18 of the towing vehicle 12 to define a horizontal axis 88. An inner pipe section 90 is secured to the subframe 68 and is received in the outer pipe section 84. Bushings 92 are received in the bushing receiving grooves of the outer pipe section 84 and serve to support the inner pipe section 90 for rotation relative to the outer pipe section 84 about the axis 88. Due to the positioning of the bushing receiving grooves at the extreme opposite ends of the interior of the outer pipe section 84, the bushings 92 also serve to prevent relative angular displacement between the inner pipe section 90 and the outer pipe section 84.

A retaining ring 94 is secured to the end of the inner pipe section 90 remote from the subframe 68 as by welding, and functions to prevent relative axial displacement between the inner pipe section 90 and the outer pipe section 84. Thrust washers 96 are positioned between the plates 74 of the subframe 68 and the outer pipe section 84, and between the outer pipe section 84 and the retaining ring 94. A grease fitting 98 is received in the outer pipe section 84 and functions to direct lubricant to both of the bushings 92 and to both of the thrust washers 96.

It will thus be understood that the articulated joint 16 permits the frame 28 of the towed vehicle 14 to pivot relative to the frame 18 of the towing vehicle 12 about a vertical axis defined by the common axes at pins 80 and 82, and further permits the frame 28 of the towed vehicle 14 to pivot relative to the frame 18 of the towing vehicle 12 about the horizontal axis 88. The joint 16 also establishes a mechanical connection between the frame 18 and the frame 28, such connection extending from the frame 18 through the outer pipe section 84, the retaining ring 94, the inner pipe section 90, the subframe 68, and the pins 80 and 82, to the frame 28. However, since the articulated frame mine dumper 10 comprises a four-wheel drive vehicle, it is not necessary to absorb the full load that is represented by towing the towed vehicle 14 through the articulated joint 16 to the drive wheels 26 of the towing vehicle 12.

Referring to FIGS. 1 and 2, the articulated frame mine dumper 10 further includes a pair of steering hydraulic cylinders 100 each connected between the shoulders 54 of the frame 28 of the towed vehicle 14 and the subframe 68 of the articulated joint 16 and hence to the frame 18 of the towing vehicle 12. The cylinders 100 cooperate to regulate the pivotable relationship of the frame 28 of the towed vehicle 14 to the frame 18 of the towing vehicle 12, and thereby effect steering of the articulated frame mine dumper 10. That is, the cylinders 100 function to selectively pivot the frame 28 of the towed vehicle 14 relative to the frame 18 of the towing vehicle 12 about the vertical axis defined by the common axes of the pins 80 and 82, and thereby cause the articulated frame mine dumper 10 to move to the left, to the right, or straight under the action of the engine 20.

The cylinders 100 are secured to the shoulders 54 of the frame 28 of the towed vehicle 14 at points located just inboard of the points of connection of the dump bed positioning cylinders 56 to the shoulders 54 of the frame 28. The positioning of the cylinders 56 and 100 on the frame 28 of the towed vehicle 14 comprise a very important feature of the present invention. Thus, the mounting of the telescoping cylinders 56 on the shoulders 54 is highly advantageous in that it allows the cylinders 56 to exert maximum power in effecting dumping of the dump bed 36. Also, since the cylinders 56 are connected to the shoulders 54, the rod ends of the cylinders are connected to the forward corners of the dump bed 36. This prevents any twisting, etc. of the dump bed 36 due to uneven loads, or the like. The connection of the steering cylinders 100 to the shoulders 54 of the frame 28 of the towed vehicle at points just inboard of the points of connection of the dump bed positioning cylinders 56 to the shoulders 54 is also highly advantageous. First, this point of connection allows the cylinders 100 to apply maximum force to the subframe 68, whereby steering of the articulated frame mine dumper 10 is effected in a rapid and efficient manner. Also, this positioning of the cylinders 100 serves to protect the steering cylinders of the vehicle from possible damage to falling rocks, collisions, and other possible occurrences in the use of the articulated frame mine dumper 10. Since the operation of the cylinders 100 is absolutely essential to the steering of the articulated frame mine dumper 10 and therefore to the entire operation of the device, protection of the cylinders 100 is considered to be highly advantageous.

Referring to FIGS. 1, 2 and 3, the towing vehicle 12 of the articulated frame mine dumper 10 further comprises an operator's compartment 102. The operator's compartment 102 includes a seat 104 and controls for regulating the operation of the engine 20 and the transmission 22 to selectively vary both the speed and the direction of operation of the articulated frame mine dumper 10, for controlling the operation of the steering hydraulic cylinders 100, thereby effecting steering of the articulated frame mine dumper 10, and for controlling the operation of the telescoping cylinders 56 and thereby regulating the positioning of the dump bed 36 of the articulated frame mine dumper.

From the foregoing, it will be understood that the articulated frame mine dumper of the present invention incorporates numerous advantages over the prior art. Perhaps most importantly, the articulated joint of the articulated frame mine dumper is economical to manufacture and yet is adapted for long term, substantially maintenance-free service. Another advantage deriving from the use of the invention relates to the location of the dump bed positioning cylinders and the steering cylinders relative to the frame of the towed vehicle. As has been discussed in detail above, such location of these cylinders has been found to be highly advantageous both with respect to the rapid and efficient operation of the articulated frame mine dumper and with respect to providing a device adapted for long term, maintenance-free service. All of the foregoing advantages are particularly desirable with respect to a device intended for underground service where any sort of equipment failure can be highly undesirable, not only with respect to the down time involved, but also with respect to the fact that it is often difficult if not impossible to gain access to the device in order to effect repairs.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:
1. An articulated frame mine dumper comprising:
a towing vehicle including a frame, an engine mounted on the frame, transmission means, and drive wheels supporting the vehicle for movement over a surface and operatively connected to the engine through the transmission means for propelling the vehicle;
a towed vehicle including a frame, wheels supporting the frame for movement over a surface, a dump body pivotally supported on the frame, and hydraulic cylinder means for selectively pivoting the dump body between material receiving and material dumping positions;

a subframe connected to the frame of the towed vehicle for pivotal movement about a vertical axis;

hydraulic cylinder means connected between a frame of the towed vehicle and the subframe and hence the frame of the towing vehicle to effect steering of the articulated frame mine dumper by selectively pivoting the frames of the towed vehicle and the towing vehicle with respect to each other about the vertical axis of pivotal movement of the subframe;

an outer pipe section secured to the frame of the towing vehicle and having a horizontal axis;

bushing receiving grooves formed in the interior of the outer pipe section at the extreme opposite ends thereof;

an inner pipe section secured to the subframe and extending through the outer pipe section;

bushings received in the bushing receiving grooves of the outer pipe section for rotatably supporting the inner pipe section and for preventing relative angular displacement between the inner and the outer pipe sections;

a retaining ring secured to the exterior of the inner pipe section at the end thereof remote from the subframe for preventing relative axial displacement between the inner and outer pipe sections; and thrust washers positioned between the subframe and the outer pipe section and between the outer pipe section and the retaining ring;

whereby the frame of the towing vehicle is permitted to pivot relative to the frame of the towed vehicle about a horizontal axis.

2. The articulated frame mine dumper according to claim 1 further characterized by means mounted in the outer pipe section at a point disposed generally midway between the bushing receiving grooves formed therein for receiving lubricant and for directing lubricant to both of the bushings and both of the thrust washers.

3. The articulated frame mine dumper according to claim 1 wherein the dump bed of the towed vehicle has an open rear end and further including a tail gate, means pivotally supporting the tail gate on the dump bed so that the tail gate closes the open rear end of the dump bed under the action of gravity when the dump bed is in the material receiving position, and means connecting the tail gate to the frame of the towed vehicle such that the tail gate is automatically pivoted to open the rear end of the dump bed when the dump bed is pivoted to the material dumping position.

4. The articulated frame mine dumper according to claim 1 wherein:

the frame of the towed vehicle comprises a forward transversely disposed member, substantially parallel rearwardly extending longitudinally disposed members, and shoulder members extending outwardly from the longitudinally disposed members on each side of the vehicle at points adjacent the forward transversely disposed member;

the dump bed pivoting hydraulic cylinder means of the towed vehicle being connected to the frame of the towed vehicle at the outboard ends of the shoulder portions of the frame; and the steering hydraulic cylinder means being connected to the frame of the towed vehicle at points on the shoulder portions located inboard from the dump bed pivoting hydraulic cylinder means.

5. The articulated frame mine dumper according to claim 1 wherein the towing vehicle further comprises an operator's compartment including controls for regulating the operation of the engine and the transmission means to control the speed of operation of the articulated frame mine dumper, controls for regulating the operation of the steering hydraulic cylinder means to control the steering of the articulated frame mine dumper, and controls for operating the dump bed pivoting hydraulic cylinder means to control the positioning of the dump bed of the mine dumper.

6. An articulated frame mine dumper comprising:

a towing vehicle having a frame, an engine mounted on the frame, transmission means, and drive wheels supporting the frame for movement over a surface and operatively connected to the engine through the transmission means for propelling the vehicle;

a towed vehicle having a frame, wheels supporting the frame for movement over a surface, a dump bed pivotally connected to the frame at the extreme rear end thereof, and hydraulic cylinder means for selectively pivoting the dump bed between a material receiving position and a material dumping position;

the frame of the towed vehicle comprising a forward transversely disposed member, substantially parallel rearwardly extending longitudinally disposed members, and shoulder members extending outwardly from the longitudinal disposed members on each side of the vehicle at points adjacent the forward transversely disposed member;

the dump bed pivoting hydraulic cylinder means of the towed vehicle being connected to the frame of the towed vehicle at the outboard ends of the shoulder portions of the frame;

joint means connecting the frame of the towing vehicle to the frame of the towed vehicle and permitting pivotal movement of the frame of the towing vehicle relative to the frame of the towed vehicle about horizontal and vertical axes; and hydraulic cylinder means connected between the frame of the towed vehicle and the frame of the towing vehicle for selectively pivoting the frame of the towed vehicle relative to the frame of the towing vehicle about the vertical axis and thereby effecting steering of the articulated frame mine dumper;

the steering hydraulic cylinder means being connected to the frame of the towed vehicle at points on the shoulder portions thereof located inboard of the dump bed pivoting hydraulic cylinder means.

7. The articulated frame mine dumper according to claim 6 wherein the joint means connecting the frame of the towing vehicle to the frame of the towed vehicle further comprises:

a subframe connected to the frame of the towed vehicle for pivotal movement about a vertical axis;

an outer pipe section secured to the frame of the towing vehicle and having a horizontal axis;

bushing receiving grooves formed in the interior of the outer pipe section at the extreme opposite ends thereof;

an inner pipe section secured to the subframe and extending through the outer pipe section;

bushings received in the bushing receiving grooves of the outer pipe section for rotatably supporting the inner pipe section and for preventing relative angular displacement between the inner and outer pipe sections;

a retaining ring secured to the exterior of the inner pipe section at the end thereof remote from the subframe for preventing relative axial displacement between the inner and outer pipe sections; and thrust washers positioned between the subframe and the outer pipe section and between the outer pipe section and the retaining ring.

8. The articulated frame mine dumper according to claim 6 wherein the dump bed pivoting hydraulic cylinder means comprises a pair of telescoping hydraulic cylinders each connected between one of the shoulder portions of the frame of the towed vehicle and the dump bed pivotally supported thereon and operable in tandem to pivot the dump bed between a substantially horizontally disposed material receiving position and a substantially vertically disposed material dumping position.

9. The articulated frame mine dumper according to claim 6 wherein the dump bed of the towed vehicle has an open rear end and further including a tail gate pivotally supported on the dump bed and positioned under the action of gravity when the dump bed is in the material receiving position to close the rear end of the dump bed, and means interconnecting the tail gate and the frame of the towed vehicle for automatically actuating the tail gate to open the rear end of the dump bed whenever the dump bed is pivoted to the material dumping position.

10. The articulated frame mine dumper according to claim 6 further characterized by means operatively connecting the transmission means of the towing vehicle and the wheels of the towed vehicle whereby all of the wheels which support the articulated frame mine dumper on the surface also function to propel the vehicle.

11. An articulated frame mine dumper comprising:
a towing vehicle having a frame, an engine mounted on the frame, transmission means, and drive wheels supporting the frame for movement over a surface and operatively connected to the engine through the transmission means for propelling the vehicle;
a towed vehicle having a frame, wheels supporting the frame for movement over a surface, a dump bed pivotally connected to the frame at the extreme rear end thereof, and hydraulic cylinder means for selectively pivoting the dump bed between a material receiving position and a material dumping position;
the frame of the towed vehicle comprising a forward transversely disposed member, substantially parallel rearwardly extending longitudinally disposed members, and shoulder members extending outwardly from the longitudinally disposed members on each side of the vehicle at points adjacent the forward transversely disposed member;
the dump bed pivoting hydraulic cylinder means of the towed vehicle being connected to the frame of the towed vehicle at the outboard ends of the shoulder portions of the frame;
a subframe connected to the frame of the towed vehicle for pivotal movement about a vertical axis;
hydraulic cylinder means connected between the frame of the towed vehicle and the subframe to effect steering of the articulated frame mine dumper by selectively pivoting the frame of the towed vehicle relative to the frame of the towing vehicle about the vertical axis of pivotal movement of the subframe;
an outer pipe section secured to the frame of the towing vehicle and having a horizontal axis;
bushing receiving grooves formed in the interior of the outer pipe section at the extreme opposite ends thereof;
an inner pipe section secured to the subframe and extending through the outer pipe section;
bushings received in the bushing receiving grooves of the outer pipe section for rotatably supporting the inner pipe section and for preventing relative angular displacement between the inner and outer pipe sections;
a retaining ring secured to the exterior of the inner pipe section at the end thereof remote from the subframe for preventing relative axial displacement of the inner and outer pipe sections; and
thrust washers positioned between the subframe and the outer pipe section and between the outer pipe section and the retaining ring;
whereby the frame of the towing vehicle is permitted to pivot relative to the frame of the towed vehicle about a horizontal axis.

12. The articulated frame mine dumper according to claim 11 further including:
means mounted in the outer pipe section for receiving lubricant and for directing lubricant to both of the bushings and both of the thrust washers;
an operator's compartment mounted on the towing vehicle and comprising means for regulating the engine and the transmission means to control the speed of operation of the articulated mine vehicle, means for regulating the steering hydraulic cylinder means to control the steering of the articulated mine vehicle, and means for regulating the dump bed pivoting hydraulic cylinder means to control the orientation of the dump bed of the articulated frame mine dumper;
a tail gate pivotally supported on the dump bed for normally closing the rear end thereof; and
means interconnecting the tail gate and the frame of the towed vehicle to automatically open the tailgate whenever the dump bed is pivoted to the dumping position.

* * * * *